Oct. 9, 1951      J. P. POMPA      2,570,374
MACHINE FOR FRYING TORTILLAS
Filed Jan. 5, 1949
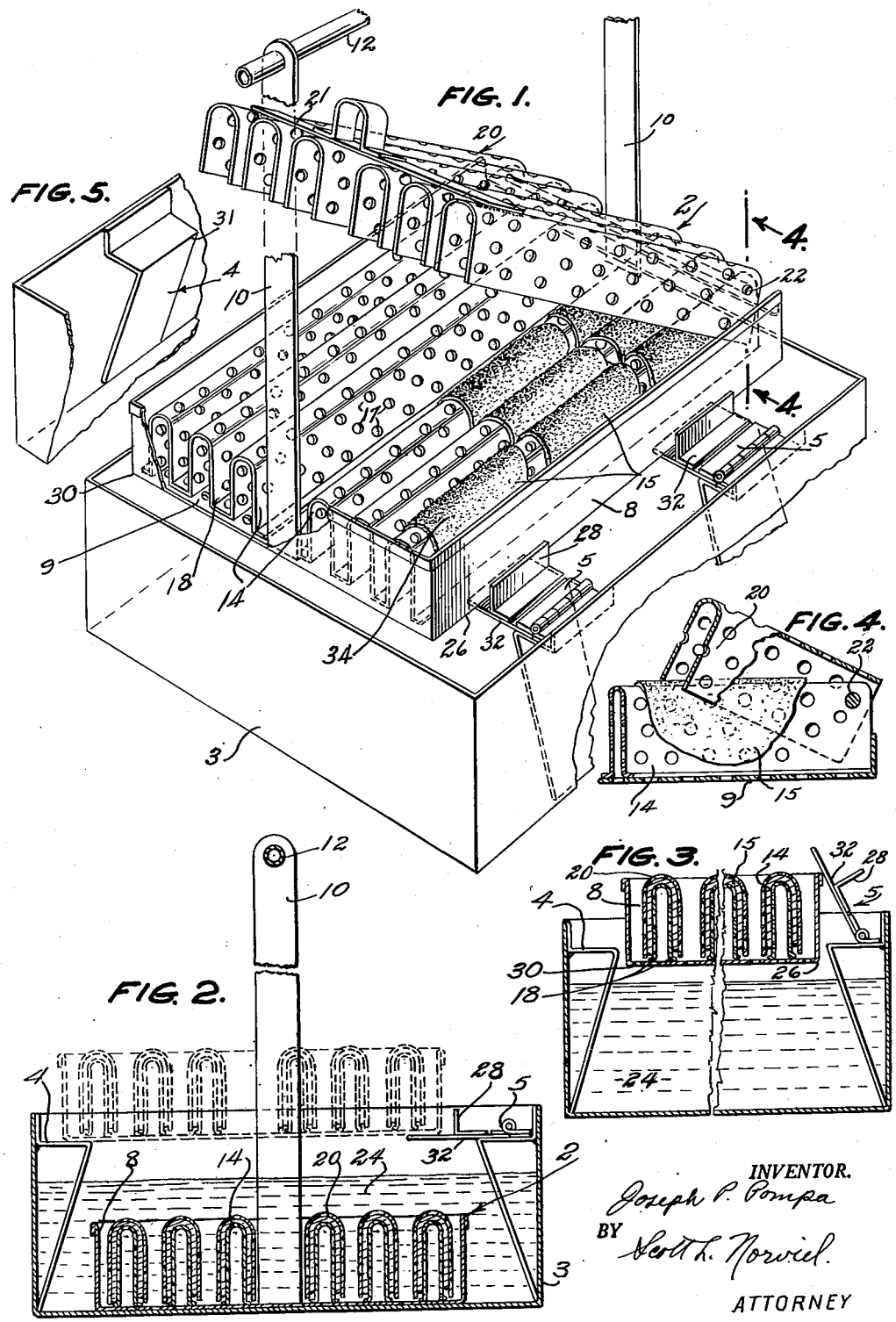
INVENTOR.
Joseph P. Pompa
BY Scott L. Norviel
ATTORNEY Patented Oct. 9, 1951

2,570,374

UNITED STATES PATENT OFFICE 2,570,374

MACHINE FOR FRYING TORTILLAS

Joseph P. Pompa, Glendale, Ariz.

Application January 5, 1949, Serial No. 69,281

5 Claims. (Cl. 99—416)

This invention pertains to machines for frying tortillas to make edible shells for tacos or other similarly prepared dishes.

Heretofore tortillas were fried by hand in deep fat and held in a position by hand as they hardened and turned crisp until they assumed the folded position desired. It is to be understood that uncooked or semi-cooked tortillas are thin, flat discs of unleavened corn or grain flour dough. In their uncooked or semi-cooked form they are soft and flexible and can be easily rolled or bent. To form edible shells for tacos and other forms of similar dishes the tortilla is folded diametrically until the two halves of each side of the fold approach each other at an acute angle. The groove and space between these halves is then stuffed with ground meat, vegetables, etc., as desired, and this product is called a taco. In order that the tortillas will maintain this folded position and to improve their taste they are fried crisp in deep fat. The tortilla then becomes an edible shell or food container, which can be used as a container for tacos. In order to produce these shells with a uniform shape and much faster than the hand method described, I have produced the machine hereinafter described.

The chief object of this machine is to provide mechanism for holding a number of tortillas (in the limp form) in a position so that a diametrical fold is formed with the halves on each side of this fold separated at a desired angle and immersed and fried crisp in deep fat, and thereafter drained and removed;

A second object is to provide a machine for the purposes above set forth, in which the limp tortillas are held in the form desired between two plates, so that when they are immersed in hot fat they will not lose their shape or float on the surface;

A third object is to provide a machine of the type concerned in which the tortillas to be fried may be easily and quickly placed over formers, arranged in parallel, at convenient intervals so that a large number of tortillas may be fried at the same time; said formers consisting of two parts, an under part over which the tortillas may be laid and a hold down part conforming to the under part, which will maintain the tortillas in the position desired and force their immersion into the hot fat;

A fourth object is to provide such a forming device with means so that it may be easily and safely immersed into a container containing hot melted fat and removed therefrom in a manner so that the grease or fat from all tortillas immersed and fried therein will drain back into the container.

Other objects will appear hereinafter.

I attain the foregoing objects by means of the device and mechanism illustrated in the accompanying drawings in which—

Figure 1 is a perspective view of my tortilla frying machine with the immersing former hinged to open position and with the under former and tray shown in elevated position;

Figure 2 is an end elevation of the machine with the near face of the grease container removed to show interior construction, and with the tray and former assembly immersed in the grease container;

Figure 3 is a similar end view with the forming and frying assembly and tray partially raised from the grease container;

Figure 4 is a fragmentary perspective view taken substantially on line 4—4, Figure 1, of an under former and a hold down former in opened position with a tortilla in place on the under former; and Figure 5, a fragmentary perspective view of a portion of the rear wall of the grease container showing, particularly, a tray rest thereon.

Similar numerals refer to similar parts in the several views.

The frying machine consists mainly of a frying former 2, a grease container 3, rear supporting shelves 4, and hinged front supporting shelves 5.

The frying former 2 includes a tray 8 having a perforated bottom 9, and upwardly extending handle supports 10 at each end, which are joined at the top by a rounded lifting handle 12.

Within tray 8 there are a number of parallel under formers 14 over which tortillas 15 are laid or draped. These under formers are made of metal strips folded to produce inverted U or V shaped sections, are perforated as at 17, and have their longitudinal edges 18 attached to the bottom of tray 8, by hard solder or by spot welding.

A plurality of immersion formers 20, having substantially the same sectional shape as the under formers are made from folded perforated metal strips. These are joined in parallel spaced relation by strip 21 at the forward edge and by a hinge pin 22 extending transversely through their rear end portions. This construction permits the group of immersion formers to hinge up from the under formers, as shown in Figure 1, or to fit over them, as shown in Figures 2 and 3, with a space between them sufficient to accommodate tortillas 15.

In the loading or removing position the tray and formers are positioned on shelves 4 and 5 over the hot grease 24 in the container 3. After loading the formers with unfried tortillas the tray and formers are lowered into the grease by first raising the tray slightly, using handle 12, so that the front edge 26 clears the stops 28 on the hinged shelves 5. The tray is then tipped slightly so that the rear tray edge 30 slides below the front edges 31 of stationary rear supporting shelves 4. The tray may then be lowered into container 3 until it rests on the bottom.

After the tortillas 15 have been fried crisp, and since the whole tray and holding assembly is covered with hot melted grease, the tray must be easily and safely raised without appreciable tilting. To do this handle 12 is grasped and the tray lifted directly upward. The rear edge 30 follows the angular forward faces of shelves 4, and the front tray edge 26 contacts and raises the free hinged inner portion 32 of shelves 5, as shown in Figure 4. The tray can then be lifted while in a horizontal position until it passes hinged shelf portions 32. Thereupon it can be lowered until it rests upon shelves 4 at the rear and the forward portion 32 of shelves 5 at the front.

Before the tray and the formers are lowered into the container 3 the top or immersion formers 20 are hinged to the open position as shown in Figure 1. Unfried tortillas 15 are then laid over the ridge of under formers 14 along their length. The top or immersion formers are then hinged down to closed position on the under formers. The weight of the immersion formers holds them in place. These formers hold the tortillas in the correct position for deep frying; that is, a diametrical fold 34 is made in each tortilla and the sides on each side as spaced apart at any desired angle, depending on the angular relation of the sides of the formers. When fried crisp in the melted fat or oil 24 in the container 3 the tortillas retain the shape impressed by the formers and become valuable food containers for making tacos and the like. It will be noted that the under formers form a support and shaping element for the limp tortillas, while the top or immersion formers hold them in place as shown in Figure 4 while they cook and bubble in the hot grease, and keep them immersed during the frying process. After frying, the entire frying former 2 is raised to the position shown in Figure 1, and the entire assembly allowed to drain into container 3. Thereafter the fried tortillas are removed with a fork, or the like, and are ready for use.

Having now fully described my invention and explained its use, I claim:

1. A machine for frying tortillas to form edible shells including a frying former having a plurality of inverted U shaped under formers over which limp baked tortillas may be draped to provide a diametrical fold disposed in parallel relation, U shaped immersion formers hinged to and adapted to cover said under formers, a tray supporting said under formers and a handle on said tray extending above said immersion formers, in combination with a hot fat container adapted to receive said formers and tray, having fixed shelves along the rear edge and upwardly hinging shelves along the front edge adapted to support said tray above the bottom of said container, so that after immersion in fluid cooking fat in said container, said tray may be raised within said container without tilting, and rested in draining position on said shelves.

2. In a machine for frying tortillas to form edible shells, including a deep fat frying container, the combination therewith of a frying former having a perforated tray, a plurality of parallel under formers consisting of perforated metal ridges attached to the top of said tray, a parallel series of immersion formers composed of perforated metal ridges hinged at one end to said under formers and adapted to cover said under formers in spaced mating relation thereto, and to hinge upward therefrom, and a lifting handle on said tray disposed above said formers.

3. A tortilla frying machine for forming a diametrical fold in tortillas to provide edible food containers for tacos, comprising in combination, a frying former consisting of a rectangular tray having a perforated bottom, a plurality of under formers consisting of perforated metal ridges adapted to receive and support tortillas to form a diametrical fold therein, positioned in parallel relation on the bottom of said tray, a series of immersion formers consisting of perforated metal ridges shaped to substantially conform to the ridges of said under formers, hinged at one end to swing from a position adapted to secure tortillas on said under formers, to a position thereabove whereby tortillas may be removed from said under formers, a handle attached to said tray and extending above said formers and, a container adapted to receive said frying former and immerse it in frying fat, having parallel front and rear top edges, stationary inwardly projecting shelves on said rear edges thereof, and upwardly hinging shelves on the front edge thereof adapted to permit substantially vertical withdrawal of said frying former therefrom and to support said frying former above the said container for draining.

4. In a machine for frying tortillas to form edible U shaped shells for holding prepared foods, having a container for holding melted fat for deep frying, the combination therewith of a tortilla frying former including, a plurality of underformers composed of perforated horizontally extending metal ridges adapted to receive and support tortillas draped over them while frying in deep fat, a support for said underformers adapted to hold them horizontally in spaced parallel relationship and having openings to admit circulation of deep frying fat through said underformers, a handle attached to said support and extending above said formers, and a plurality of immersion formers consisting of perforated metal shaped to fit over said underformers in mating relation thereto, and hinged to said underformers near one end thereof so that said immersion formers may be swung from a holding position, covering said underformers, to an open position whereby the tops of said underformers are exposed.

5. In a machine for frying tortillas to form edible U shaped shells for tacos, a frying former composed of, a plurality of underformers composed of perforated horizontally extending metal ridges adapted to support tortillas while frying in deep fat, a support for said underformers adapted to hold them horizontally in spaced parallel relationship and having openings to admit circulation of deep frying fat through said underformers, a handle attached to said support and extending above said formers, and a plurality of immersion formers consisting of perforated metal shaped to fit over said underformers in mating relation thereto, and hinged to said underformers near one end thereof so that said immersion formers may be swung from a holding position, covering said underformers, to an open position whereby the tops of said underformers are exposed.

JOSEPH P. POMPA.

REFERENCES CITED

The following references are of record in the file of this patent:

UNITED STATES PATENTS

| Number | Name | Date |
|---|---|---|
| 1,233,909 | Richardson | July 17, 1917 |
| 1,374,522 | Peterson | Apr. 12, 1921 |
| 1,630,309 | Pitman | May 31, 1927 |
| 1,699,221 | Carter | Jan. 15, 1929 |
| 1,925,265 | Mahey | Sept. 5, 1933 |
| 2,080,171 | Fairbanks et al. | May 11, 1937 |
| 2,092,849 | Maier | Sept. 14, 1937 |
| 2,238,549 | Bierek | Apr. 15, 1941 |
| 2,506,305 | Maldonado | May 2, 1950 |